Aug. 18, 1959  A. S. JACOB  2,900,591
GENERATOR REGULATOR SYSTEM
Filed Feb. 12, 1958  2 Sheets-Sheet 1
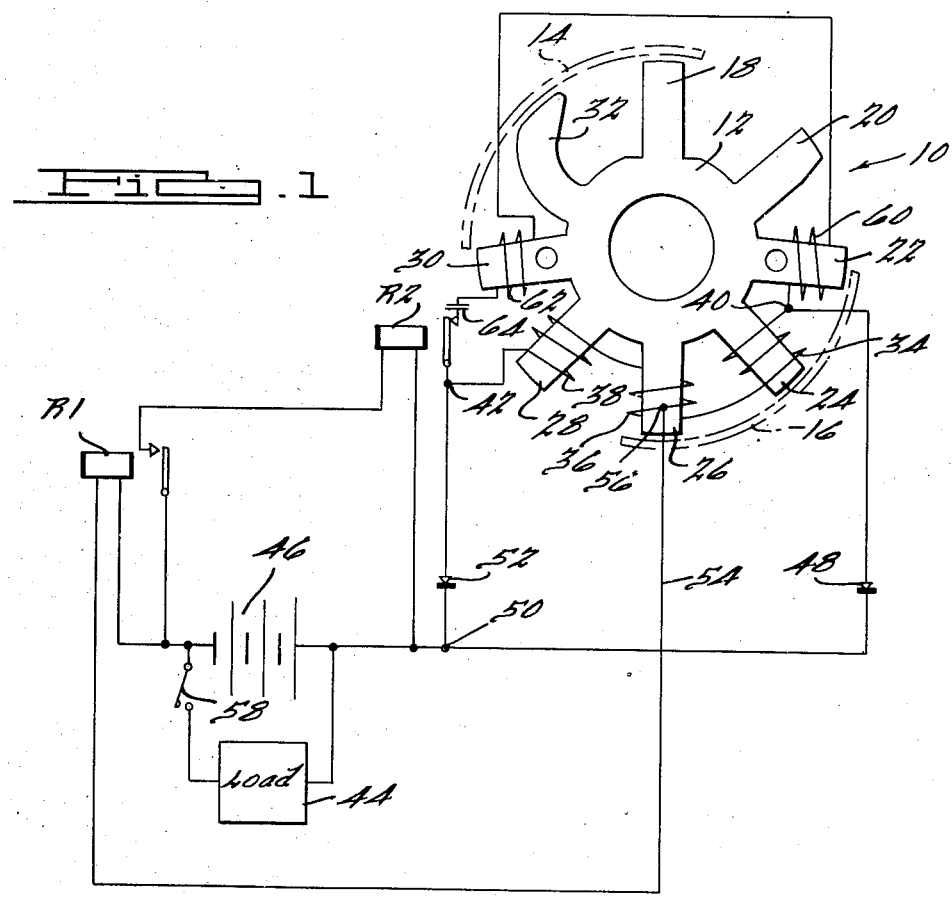
INVENTOR.
Allan S. Jacob
BY
Harness, Dickey & Pierce
ATTORNEYS Aug. 18, 1959  A. S. JACOB  2,900,591
GENERATOR REGULATOR SYSTEM
Filed Feb. 12, 1958  2 Sheets-Sheet 2
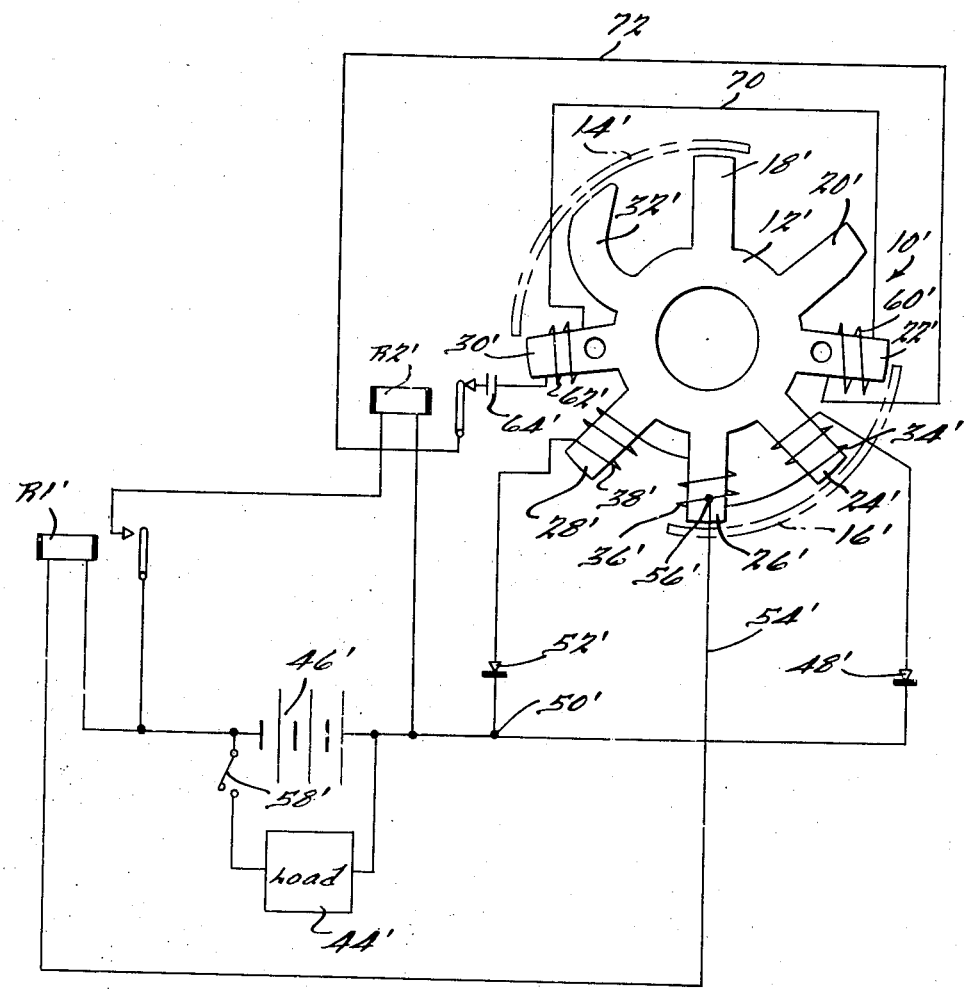
INVENTOR.
Allan S. Jacob
BY
Harness, Dickey & Pierce
ATTORNEYS.

United States Patent Office 2,900,591
Patented Aug. 18, 1959

2,900,591

GENERATOR REGULATOR SYSTEM

Allan S. Jacob, Rochester, Mich., assignor to Syncro Corporation, Oxford, Mich., a corporation of Michigan Application February 12, 1958, Serial No. 714,800

18 Claims. (Cl. 320—59)

This application is a continuation-in-part of application No. 576,856, filed April 9, 1956, now abandoned.

This invention relates to generator regulating systems.

In customary battery-generator-regulator systems, such as those employed in vehicular use, the regulating apparatus is normally adapted to perform the plural functions of controlling the magnitude of the average voltage difference between the generator output and the battery voltage, of controlling the battery charging rate and of serving as an interrupter or cutout to prevent discharge of the battery through the generator when the generator output is lower than the battery voltage to a preselected extent. Control of the output of the generator is conventionally accomplished by employing a sensing and control relay which controls the inter-position of a current-limiting resistor in series with the generator field.

In generator systems in which permanent magnetic fields are employed, the aforesaid customary method of regulating the generator output is not feasible and in most commercial applications of such generator systems, there is no regulation of the generator output.

In the copending application of Thomas F. Carmichael, entitled "Generator System," Serial No. 539,743, filed October 11, 1955, now abandoned, and in the continuation-in-part applications based thereon, an improved permanent-magnet generator is disclosed which is suitable for use as an element of a generator-battery system. In general, the generator disclosed in the noted patent application, Serial No. 589,216, filed June 4, 1956 (now abandoned) and Serial No. 628,439, filed December 14, 1956, comprises a multi-pole armature and a permanent-magnetic field rotatably mounted with respect to one another. A plurality of series-connected main generating coils, disposed upon a core structure, are connected across the output terminals of the device. An active network comprising a capacitor and one or more other voltage-generating coils is also connected across those terminals. The addition of the noted network under normal circumstances, substantially increases the magnitude of the generator's output. In a modified arrangement, the active network is electrically insulated from the voltage generating coils, but includes an element or elements magnetically coupled to those coils.

In certain of the contemplated applications of that generator in conjunction with gasoline engines, the generator is associated with a battery to provide a system capable of supplying electrical energy of adequate magnitude to handle a relatively large load while the engine is operating and to energize a starting motor when the engine is idle. In such an arrangement, it is desirable that a regulating arrangement be provided to prevent damage to the battery during charging and to prevent discharge of the battery during periods of low or zero generator output. To that end, this invention is directed.

The object of this invention is to provide a regulating system for a generator of the type having an active network additional to the main generating windings.

The manner of accomplishing the foregoing object, and other objects of the invention, will be perceived from the following detailed description of embodiments of the invention when read with reference to the accompanying drawings, in which:

Figure 1 is a schematic representation of one form of generator-battery-regulator system embodying the principles of the present invention; and Fig. 2 is a schematic representation of a modified arrangement.

The generator generally designated 10 embodies certain of the principles of the invention presented in the above-noted copending patent application, and the disclosure of that application is intended to be incorporated herein, by reference, to the same extent as if its drawings and specification were reproduced as a part hereof. For convenience, generator 10 as illustrated as including a core structure 12 and a field structure including permanent magnets 14 and 16 (represented in phantom) of a form customarily employed as elements of a magneto-ignition system for small gasoline engines. Core 12 is provided with a plurality of radially extending pole pieces 18, 20, 22, 24, 26, 28, 30 and 32. Means are provided for imparting relative rotational motion between the core structure 12 and the permanent magnetic field structure 14 and 16, it being assumed for purposes of description that the field structure including permanent magnets 14 and 16 is the rotatable element, being rotated about its central axis by some external source (not shown) such as a gasoline engine. In the disclosed arrangement, pole pieces 18, 20 and 32 are not utilized as coil-carrying elements, although in practice they may be employed to carry voltage generating coils. Alternatively, a magneto-ignition system coil may be disposed upon leg 18 in the manner well known in the art.

Main generating coils 34, 36 and 38 are wound upon poles 24, 26 and 28, respectively, and are connected in series, in proper phase relationship, between terminals 40 and 42. As a result, upon relative rotation between core 12 and the field structure, an alternating voltage is developed between terminals 40 and 42 by the action of the coils 34, 36 and 38. The voltage between terminals 40 and 42 may be employed directly to energize a load. In the illustrated arrangement, however, this voltage is employed both to energize a load 44 and to charge a storage battery 46 and hence the alternating voltage output is rectified. A rectifier 48 which may, for example, be of the dry disk type, is connected between terminal 40 and terminal 50 and a similar rectifying device 52 is connected between terminals 42 and 50. As a result, a direct voltage appears between terminal 50 and a conductor 54 connected to the center tap 56 of the coil system comprising coils 34, 36 and 38. Load 44 is selectively connectible in parallel with battery 46 upon the manual closure of switch 58. This combination of elements is connected in series between terminal 50 and conductor 54. In the representative showing, the winding of a control relay R1 is also connected in that series circuit for a purpose to be noted.

The positive terminal of battery 46 is connected to terminal 50. Rectifying devices 48 and 52 are so connected that they present a low impedance to conventional current flow from terminals 40 and 42, respectively, to terminal 50 and a high impedance to conventional current flow in the reverse direction. Thus, when the generator 10 is operating, terminal 50 will be at a voltage which is positive relative to the voltage on conductor 54. Generator 10 should be so designed that the voltage between terminal 50 and conductor 54 as a result of rectification of the output of coils 34, 36 and 38 is at least equal to and preferably a small amount greater than the normal voltage across battery 46 at normal running speeds of the generator 10.

The winding of relay R1 is connected in series with battery 46 and with the potential between terminal 50 and conductor 54. In view of the polarities of these two voltage sources, relay R1 is responsive to the difference between those voltages. Since the energizing current for relay R1 must pass through rectifiers 48 and 52, relay R1 will be operated only if the generator voltage, appearing between terminal 50 and conductor 54, exceeds the voltage, across battery 46 by a preselected amount. Relay R1 is provided with a winding adequately heavy to handle the expected magnitudes of current flow, and is preferably adequately sensitive so that it will operate when the direct voltage between terminal 50 and conductor 54 is but little greater than the voltage across battery 46. The function performed by relay R1 will be described hereinafter.

In accordance with the teachings of the aforesaid copending patent application, generator 10 is provided with an active network in parallel with the main generating coils 34, 36 and 38. In the herein disclosed arrangement, voltage generating coils 60 and 62 are wound upon poles 22 and 30, respectively, of the core structure 12. These coils are connected in series with one another (in proper phase relationship), and in series with a capacitor 64, between terminals 40 and 42. This circuit is established or disestablished by the normally closed contacts of relay R2, as will be noted. The connection of this active network across the output terminals 40 and 42 causes the generator 10 to produce a very substantially increased output voltage, particularly at lower running speeds. As was discussed in the noted application, the addition of a network of the shown nature also permits the curve of output voltage versus running speed of the generator to be tailored to a given task. For example, the output voltage may be made to reach a maximum value at a generator running speed somewhat less than the maximum expected running speed of that generator, that maximum value being so selected that load devices supplied by the generator will not be damaged at any running speed of the generator. Since the provision of the added active network tends substantially to increase the output of the generator at slower running speeds (relative to customary generator constructions), it will be perceived that the output voltage versus running speed curve may be made considerably flatter than has heretofore been possible. In the disclosed arrangement, it is assumed that the design parameters, including the size of capacitor 64, are so selected that the output voltage of the generator will be greater, at least at any low or normal running speed when the active network is connected than it is when the active network is disconnected. That is, it is assumed that the direct voltage between terminal 50 and conductor 54 will be greater with relay R2 released than with relay R2 operated.

As before noted, relay R1 will operate when the voltage between terminal 50 and conductor 54 exceeds, by a preselected amount, the voltage across battery 46. Upon the operation of relay R1 and the consequent closure of its normally open contacts, the winding of relay R2 is connected directly across battery 46. The resistance of the winding of relay R2 is preferably relatively high so that it will not unduly load the battery 46. If the voltage across battery 46 reaches a preselected value, indicative that the charging rate should be reduced, relay R2 operates to open its normally closed contacts, disconnecting the active network, comprising coils 60 and 62 and capacitor 64, from its connection across terminals 40 and 42. As a result, the voltage between terminal 50 and conductor 54 decreases and the charging rate correspondingly decreases. When the voltage across battery 46 decreases to such a value that relay R2 releases, the connection of the active network across terminals 40 and 42 is reestablished, the voltage between terminal 50 and conductor 54 increases and the charging rate increases.

It will be observed that if switch 58 is closed so that the load 44 is connected in parallel with battery 46, the resistance of the load 44 will also tend to exert an influence on the voltage across relay R2 so that generator 10 will normally be connected to its maximum output condition when the current requirements of the load are heavy.

In practice, electromagnetic relay R2 may be designed to have a substantial spread between the value of the operating current and the value of the release current thereof so that the position of its contacts is changed only in response to fairly appreciable changes in the voltage across battery 46. On the other hand, the difference between the operating current and releasing current requirements of relay R2 may be relatively small, in which case the frequency of opening and closing of the contacts of that relay will tend to increase, to the point, if desired, of the vibratile operation employed in certain customary voltage regulating devices. The operations of the system will, of course, be the same under either circumstance.

The function of relay R1 is to disconnect the winding of relay R2 from the battery 46 when the voltage between terminal 50 and conductor 54 is a preselected amount less than the voltage across battery 46. Since relay R2 could not be operated under these conditions, there is no necessity of maintaining a discharge path for battery 46 through the winding of relay R2.

The modified arrangement illustrated in Fig. 2 of the drawings is, for clarity of presentation, illustrated as being similar to the system of Figure 1 and corresponding parts bear corresponding reference characters distinguished by a prime. In Fig. 2, the generator 10' is again shown as having a plurality of main windings 34', 36' and 38' adapted to supply charging current for batery 46' and load current for load device 44' through rectifiers 48' and 52'. The control circuits including relays R1' and R2', the latter of which is responsive to the voltage across battery 46', are the same as those illustrated in Fig. 1, and consequently need not be redescribed.

In Fig. 1, capacitance 64 is connected in circuit with the resonant-circuit winding means 60—62 through the load and through the winding means 34—36—38, that is, the resonant network or circuit including voltage generating winding means 60 and 62 and capacitance 64 is electrically connected in parallel with the winding means 34—36—38. The contact of control relay R2 serves to selectively establish and disestablish that electrical connection.

In the Fig. 2 arrangement, the capacitance 64' is connectible in closed circuit relationship with winding means 60' and 62', one terminal of winding means 62' being connected to one terminal of capacitor 64', the other terminal of capacitor 64' being connected through the contacts of relay R2' to conductor 72 which is connected to one terminal of winding means 60' and the other terminal of winding means 60' being connected to the remaining terminal of winding means 62' by conductor 70. Thus, there is no direct electrical connection between the resonant circuit or network and the winding means 34—36—38, those winding means being effectively electrically insulated from the resonant circuit. However, the resonant circuit winding means is magnetically linked or coupled to the main winding means and it has been found that such an arrangement will produce a similar increase in output power capabilities over the prior art devices to that obtained by the use of the generator structure illustrated in Fig. 1. For proper operation, it is important that the resonant circuit winding means be coupled to the main winding means whether that coupling be solely magnetic, as in the case of Fig. 2 or whether the electrical connections shown in Fig. 1 be present to establish an electrical coupling between the resonant circuit and the main winding means.

It will be observed that in both of the illustrated systems, the contacts of relay R2 serve to control the effectiveness of the resonant circuit or network by opening and closing the circuit including the resonant-circuit winding means and the capacitor. In effect, the opening of the contacts places a large (substantially infinite) resistance in series in the resonant circuit so as to change the effective impedance of the inductance-capacitance-resistance resonant circuit. With the electrical contacts of relay R2 open, the effective impedance to the flow of current through the resonant network is effectively infinite so that the network is disabled to increase the power output of the generator, while with those contacts closed, the effective impedance to current flow in the resonant circuit is reduced to the point where that resonant circuit is enabled to co-operate with the main windings of the generator to produce an increased output.

It will be appreciated that the modifications of the generator structure presented in the above-identified applications of Thomas F. Carmichael may also be applied to the present teachings.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A regulated power supply system comprising a generator including first voltage generating winding means and a resonant network including another voltage generating winding means, and selectively actuatable means responsive to a voltage in said system for connecting said network across at least a portion of said first winding means.

2. A regulated power supply system comprising a battery, a generator including first voltage generating winding means and a resonant network including another voltage generating winding means, and means responsive to the magnitude of the voltage across said battery for selectively connecting said network across at least a portion of said first winding means.

3. A regulated power supply system comprising a battery, a generator including first voltage generating winding means and a resonant network including another voltage generating winding means, and means effective when the voltage across said battery is less than a preselected value for connecting said network across said first winding means and effective when the voltage across said battery is greater than a preselected value for disconnecting said network from across said first winding means.

4. A regulated power supply system comprising a battery, a generator including first voltage generating winding means and a resonant network including another voltage generating winding means, means connecting said generator to charge said battery, and means responsive to the magnitude of the voltage across said battery for selectively connecting said network across at least a portion of said first winding means.

5. A regulated power supply system comprising a battery, a generator including first voltage generating winding means and a resonant network including another voltage generating winding means, rectifying means, means including said rectifying means for connecting said first winding means in series with said battery, and means responsive to the magnitude of the voltage across said battery for selectively connecting said network across at least a portion of said first winding means.

6. A regulated power supply system comprising a generator including a field structure, a core, means for permitting relative rotational motion between said field structure and said core, first voltage generating winding means wound upon said core, and a network including a capacitor and another voltage generating winding means on said core, and selectively actuatable means responsive to a voltage in said system for connecting said network across at least a portion of said first winding means.

7. A regulated power supply system comprising a generator including a field structure, a core, means for permitting relative rotational motion between said field structure and said core, first voltage generating winding means wound upon said core, and a network including a capacitor and another voltage generating winding means on said core, a battery, rectifying means, means including said rectifying means for connecting said generator in charging relationship with said battery, and means responsive to the magnitude of the voltage across said battery for selectively connecting said network across at least a portion of said first winding means.

8. A regulated power supply system comprising a generator including a field structure, a core, means for permitting relative rotational motion between said field structure and said core, first voltage generating winding means wound upon said core, and a network including a capacitor and another voltage generating winding means on said core, a first rectifier connected to one end of said first winding means, a second rectifier connected to the other end of said first winding means, a center tap on said first winding means, a battery, means including said battery connected between said rectifiers and said center tap, relay means having a winding connected across said battery and a pair of normally closed contacts, and means including said contacts for connecting said network across at least a portion of said first winding means.

9. A regulated power supply system comprising a battery, a generator including first voltage generating winding means and a resonant network including another voltage generating winding means, voltage-responsive control means for selectively connecting said network across at least a portoin of said first winding means, and selectively actuatable means for connecting said control means across said battery.

10. A regulated power supply system comprising a generator including a field structure, a core, means for permitting relative rotational motion between said field structure and said core, first voltage generating winding means wound upon said core, and a network including a capacitor and another voltage generating winding means on said core, a battery, rectifying means, means including said rectifying means for connecting said generator in charging relationship with said battery, voltage-responsive control means for selectively connecting said network across at least a portion of said first winding means, and means effective when the rectified output voltage of said generator exceeds the voltage across said battery by a preselected amount for connecting said control means across said battery.

11. A regulated power supply system comprising a generator including a field structure, a core, means for permitting relative rotational motion between said field structure and said core, first voltage generating winding means wound upon said core, and a network including a capacitor and another voltage generating winding means on said core, a battery, rectifying means, means including said rectifying means for connecting said generator in charging relationship with said battery, voltage-responsive control means for selectively connecting said network across at least a portion of said first winding means, and means effective when the rectified output voltage of said generator exceeds the voltage across said battery by a preselected amount for connecting said control means across said battery and effective when the voltage across said battery exceeds the rectified output voltage of said generator for disconnecting said control means from said battery.

12. A regulated power supply system comprising a generator including first voltage generating winding means and a resonant network coupled to at least a portion of said first voltage generating winding means and including another voltage generating winding means, and selectively actuatable means responsive to a voltage in said system for controlling the effectiveness of said resonant network.

13. A regulated power supply system comprising a battery, a generator including first voltage generating winding means and a resonant circuit coupled to at least a portion of said first voltage generating winding means and including another voltage generating winding means, and selectively actuatable means responsive to the magnitude of the voltage across said battery for varying the effective impedance of said resonant circuit.

14. A regulated power supply system comprising a generator including first voltage generating winding means and a resonant network coupled to at least a portion of said first voltage generating winding means and including another voltage generating winding means and a capacitor, circuit means for establishing a circuit including said another voltage generating winding means and said capacitor, and means responsive to a voltage in said system for selectively establishing and disestablishing said circuit.

15. A regulated power supply system comprising a generator including first voltage generating winding means and a resonant network coupled to at least a portion of said first voltage generating winding means and including another voltage generating winding means and a capacitor, circuit means including at least a portion of said first voltage generating winding means for establishing a circuit including said another voltage generating winding means and said capacitor, and means responsive to a voltage in said system for selectively establishing and disestablishing said circuit.

16. A regulated power supply system comprising a generator including a core, first voltage generating winding means on said core, and a resonant network including another voltage generating winding means on said core, means including said core for magnetically coupling said first voltage generating winding means and said additional voltage generating winding means, said first voltage generating winding means being electrically insulated from said resonant network, and selectively actuatable means responsive to a voltage in said system for controlling said resonant network.

17. A regulated power supply system comprising a generator including a core, first voltage generating winding means on said core, and a resonant network including another voltage generating winding means on said core, means including said core for magnetically coupling said first voltage generating winding means and said additional voltage generating winding means, said first voltage generating winding means being electrically insulated from said resonant network, and selectively actuatable means responsive to a voltage in said system for selectively varying the effective impedance of said resonant network.

18. A regulated power supply system comprising a generator including a core, first voltage generating winding means on said core, a resonant network including another voltage generating winding means on said core, and a capacitance, means including conductive means for connecting said additional voltage generating winding means and said capacitance in closed circuit, means including said core for magnetically coupling said first voltage generating winding means and said additional voltage generating winding means, said first voltage generating winding means being electrically insulated from said resonant network, and selectively actuatable means responsive to a voltage in said system for varying the effective impedance of said resonant network.

No references cited.